(12) United States Patent
Wei (10) Patent No.: US 11,231,821 B2
(45) Date of Patent: Jan. 25, 2022

(54) TOUCH PANEL AND PRESSURE TOUCH DETECTION METHOD THEREOF, AND TOUCH APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Xiangye Wei, Beijing (CN)

(73) Assignees: BEIJING BOE OPOTOELECTRONICS TECHNOLOGY CO., LTD., Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 380 days.

(21) Appl. No.: 16/470,736

(22) PCT Filed: Nov. 14, 2018

(86) PCT No.: PCT/CN2018/115432
§ 371 (c)(1),
(2) Date: Jun. 18, 2019

(87) PCT Pub. No.: WO2019/174288
PCT Pub. Date: Sep. 19, 2019

(65) Prior Publication Data
US 2021/0333931 A1  Oct. 28, 2021

(30) Foreign Application Priority Data

Mar. 16, 2018 (CN) .......................... 201810217394.4

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 3/0447* (2019.05);
(Continued)

(58) Field of Classification Search
None
See application file for complete search history.

(56) References Cited

U.S. PATENT DOCUMENTS 8,749,498 B2 *  6/2014  Lim ........................ G06F 3/041
                                                345/173
2011/0096025 A1    4/2011  Slobodin et al.
2012/0262410 A1 * 10/2012  Lim ...................... G06F 3/0416
                                                345/174

FOREIGN PATENT DOCUMENTS

CN      101266906 A      9/2008
CN      101930316 A     12/2010
(Continued)

OTHER PUBLICATIONS

International Search Report and Written Opinion dated Feb. 18, 2019 from State Intellectual Property Office of the P.R. China.
First Office Action issued by the Chinese Patent Office in the priority Chinese application No. 201810217394.4 dated Feb. 3, 2020 and its English translation.
Extended European Search Report from European Patent Application No. 18887231.1 dated Nov. 9, 2021.

*Primary Examiner* — Duane N Taylor, Jr.
(74) *Attorney, Agent, or Firm* — Dilworth & Barrese, LLP.; Michael J. Musella, Esq.

(57) ABSTRACT

A touch panel, a touch apparatus and a pressure touch detection method thereof. The touch panel includes: a touch electrode layer; a conductive layer, disposed opposite to the touch substrate and configured to form capacitance with the touch electrode layer; a dielectric layer, located between the touch electrode layer and the conductive layer, the dielectric
(Continued)

layer includes a fluid dielectric layer and a solid dielectric layer, and the fluid dielectric layer has a dielectric constant larger than a dielectric constant of the solid dielectric layer, and a fluid in the fluid dielectric layer is configured to flow under the touch pressure to change the dielectric constant of the dielectric layer, so that the capacitance between the touch electrode layer and the conductive layer at the touch position and in the peripheral region of the touch position changes.

20 Claims, 4 Drawing Sheets

(52) U.S. Cl.
CPC .............. *G06F 2203/04102* (2013.01); *G06F 2203/04105* (2013.01)

(56) References Cited

FOREIGN PATENT DOCUMENTS

| | | | |
|---|---|---|---|
| CN | 102831947 | A | 12/2012 |
| CN | 103970374 | A | 8/2014 |
| CN | 104345444 | A | 2/2015 |
| CN | 104656249 | A | 5/2015 |
| CN | 104991681 | A | 10/2015 |
| CN | 106020529 | A | 10/2016 |
| CN | 106125974 | A | 11/2016 |
| CN | 106406627 | A | 2/2017 |
| EP | 2930597 | A2 | 10/2015 |
| KR | 20140080596 | A | 7/2014 |

* cited by examiner

TOUCH PANEL AND PRESSURE TOUCH DETECTION METHOD THEREOF, AND TOUCH APPARATUS

The application claims priority of the Chinese patent application No. 201810217394.4, filed on Mar. 16, 2018, the entire disclosure of which is incorporated herein by reference as part of the present application.

TECHNICAL FIELD

At least one embodiment of the disclosure relates to a touch panel and a pressure touch detection method thereof, and a touch apparatus.

BACKGROUND

Currently, the capacitive touch technology of the touch panel technology is more commonly used. Generally, capacitive touch panels are of self-capacitive type and mutual capacitive type. The self-capacitive type touch panel comprises a touch electrode array made of a transparent conductive material on a base substrate, and the touch electrodes respectively form a capacitance with the ground. When a finger touches the self-capacitive type touch panel, the capacitance of the finger is superimposed on the corresponding touch electrode, and a touch detection chip can determine a touch position by detecting a change of the capacitance value of each touch electrode during a touch time period. The mutual capacitive type touch panel comprises a lateral electrode and a longitudinal electrode made of the transparent conductive material on the base substrate which are insulated from each other, and capacitance is formed at a position where two sets of electrodes intersect.

SUMMARY

At least one embodiment of the disclosure provides a touch panel, comprising: a touch electrode layer; a conductive layer, disposed opposite to the touch electrode layer and configured to form capacitance with the touch electrode layer; a dielectric layer, located between the touch electrode layer and the conductive layer, the dielectric layer comprising a fluid dielectric layer and a solid dielectric layer, the fluid dielectric layer having a dielectric constant larger than that of the solid dielectric layer, a fluid in the fluid dielectric layer being configured to flow under a touch pressure to change the capacitance between the touch electrode layer and the conductive layer at a touch position and in a peripheral region of the touch position by changing a dielectric constant of the dielectric layer, and a capacitance variation being used to determine the touch pressure.

In some examples, the fluid dielectric layer is further configured to: under the touch pressure, the fluid in the fluid dielectric layer at the touch position flows to the peripheral region so that the dielectric constant of the dielectric layer at the touch position is decreased compared with that before the touch occurs, causing the capacitance between the touch electrode layer and the conductive layer at the touch position to be decreased, and the dielectric constant of the dielectric layer in the peripheral region is increased compared with that before the touch occurs, causing the capacitance between the touch electrode layer and the conductive layer in the peripheral region to be increased.

In some examples, at least one of the touch electrode layer and the conductive layer comprises a plurality of sub-electrodes arranged in a two-dimensional array.

In some examples, the touch electrode layer is configured to detect the touch position.

In some examples, the touch panel is a flexible touch panel.

In some examples, the solid dielectric layer is a flexible layer.

In some examples, the fluid dielectric layer is a liquid dielectric layer, and the solid dielectric layer is in contact with a surface of the liquid dielectric layer.

In some examples, the fluid dielectric layer comprises a liquid dielectric layer and an air layer, the air layer is located on a side of the liquid dielectric layer facing the touch electrode layer, and a dielectric constant of the air layer is smaller than that of the liquid dielectric layer.

In some examples, upon the touch pressure being not applied, the dielectric constant $\varepsilon_{air}$ of the air layer, the dielectric constant $\varepsilon_{liquid}$ of the dielectric layer, a thickness $d_{air}$ of the air layer and a thickness $d_{liquid}$ of the liquid dielectric layer satisfy the following relationship:

$$10 \times d_{air} \times \varepsilon_{air} \geq d_{liquid} \times \varepsilon_{liquid} \geq 5 \times d_{air} \times \varepsilon_{air}$$

In some examples, the liquid dielectric layer comprises an electrolyte, a solvent of the electrolyte comprises acetonitrile and/or propylene carbonate, and a solute of the electrolyte comprises tetraethylammonium tetrafluoroborate.

In some examples, the conductive layer is a gold foil layer, and a thickness of the gold foil layer is in a rage from 100 μm to 300 μm in a direction perpendicular to the gold foil layer.

In some examples, the touch electrode layer comprises a two-dimensional touch electrode array, the two-dimensional touch electrode array comprises a plurality of sensing electrodes, and the capacitance is formed between the plurality of sensing electrodes and the conductive layer.

An embodiment of the disclosure provides a touch apparatus comprising the touch panel according to any items as mentioned above.

An embodiment of the disclosure a pressure touch detection method of the touch panel as mentioned above, comprising: detecting the capacitance between the touch electrode layer and the conductive layer at the touch position and in the peripheral region, wherein, upon the touch occurring, the fluid in the fluid dielectric layer flows under the touch pressure to change the capacitance between the touch electrode layer and the conductive layer at the touch position and in the peripheral region by changing the dielectric constant of the dielectric layer; determining the touch pressure at the touch position according to the capacitance variation between the touch electrode layer and the conductive layer at the touch position and in the peripheral region.

In some examples, detecting the capacitance between the touch electrode layer and the conductive layer at the touch position and in the peripheral region comprises: detecting the capacitance between the touch electrode layer and the conductive layer at the touch position as a first capacitance, the first capacitance being decreased compared with that before the touch occurs, a capacitance variation amount of the first capacitance being a first capacitance variation amount; detecting the capacitance between the touch electrode layer and the conductive layer in the peripheral region as a second capacitance, the second capacitance being increased compared with that before the touch occurs, and a capacitance variation amount of the second capacitance being a second capacitance variation amount.

In some examples, determining the touch pressure at the touch position according to the capacitance variation between the touch electrode layer and the conductive layer at the touch position and in the peripheral region comprises: calculating a ratio of the second capacitance variation amount to the first capacitance to obtain a capacitance ratio, and determining the touch pressure at the touch position according to the capacitance ratio.

In some examples, a calculation formula of the capacitance between the touch electrode layer and the conductive layer is: $C=K*\varepsilon/(d1+d2)$, where K is a constant, $\varepsilon$ is the dielectric constant of the dielectric layer, d1 is a thickness of the solid dielectric layer, d2 is a thickness of the fluid dielectric layer, and under the touch pressure, the thickness d2 of the fluid dielectric layer at the touch position is decreased, so that both of the dielectric constant $\varepsilon$ and the thickness (d1+d2) of the dielectric layer is decreased, and a decreasing ratio of the dielectric constant $\varepsilon$ is larger than a decreasing ratio of the thickness (d1+d2) of the dielectric layer, causing the first capacitance to be decreased compared with that before the touch occurs.

In some examples, the touch panel is a flexible touch panel, and under the touch pressure, the thickness d2 of the fluid dielectric layer in the peripheral region is increased, so that both of the dielectric constant $\varepsilon$ and the thickness (d1+d2) of the dielectric layer are increased, and an increasing ratio of the dielectric constant $\varepsilon$ is larger than an increasing ratio of the thickness (d1+d2) of the dielectric layer, causing the second capacitance to be increased compared with that before the touch occurs.

In some examples, the fluid dielectric layer comprises a liquid dielectric layer and an air layer, and the air layer is located on a side of the liquid dielectric layer facing the touch electrode layer, and under the touch pressure, in the peripheral region, the thickness (d1+d2) of the dielectric layer is decreased, and the thickness of the liquid dielectric layer is increased, so that the dielectric constant $\varepsilon$ is increased, causing the second capacitance to be increased compared with that before the touch occurs.

In some examples, the capacitance ratio is in positive proportional relationship with a value of the touch pressure, and before determining the touch pressure at the touch position, the method further comprises: according to the proportional relationship, dividing a plurality of capacitance ratios being detected into a plurality of capacitance ratio ranges, and dividing values of the touch pressure into a plurality of touch pressure levels, wherein the plurality of capacitance ratio ranges are in an one-to-one correspondence with the plurality of touch pressure levels.

In some examples, determining the touch pressure at the touch position comprises: determining the touch pressure level applied to the touch apparatus according to the capacitance ratio range.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the disclosure, are not intended to indicate any sequence, amount or importance, but distinguish various components. The terms "comprise," or "include," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly, In study, the inventor of the application found that: currently, in the liquid crystal display industry, the detection of pressure can be achieved by adding a metal frame in a module of a liquid crystal display device, which provides the detection in a direction perpendicular to a plane of a display screen, to achieve the three-dimensional touch detection. However, it is difficult to use a fixed metal plate as a reference surface in a flexible device.

Embodiments of the disclosure provide a touch panel, a pressure touch detection method thereof, and a touch apparatus. The touch panel comprises a touch substrate, a dielectric layer, and a conductive layer. The touch substrate comprises a touch electrode layer, configured to detect a touch position; a conductive layer, disposed opposite to the touch substrate, and configured to form capacitance with the touch electrode layer; and a dielectric layer, located between the touch electrode and the conductive layer, the dielectric layer comprises a fluid dielectric layer and a solid dielectric layer, a dielectric constant of the fluid dielectric layer is larger than a dielectric constant of the solid dielectric layer, and a fluid in the fluid dielectric layer is configured to flow under touch pressure to change the capacitance between the touch electrode layer and the conductive layer at the touch position and in the peripheral region of the touch position by changing the dielectric constant of the dielectric layer, and the capacitance variation is used to determine the touch pressure. The fluid dielectric layer comprised in the touch panel can be applied to the flexible touch panel to detect the pressing force of the user, so as to respond to the corresponding operation according to the pressing force to improve the human-computer interaction function, category and manner of the touch panel.

The touch panel, the pressure touch detection method and the touch apparatus according to the embodiments of the disclosure are described below with reference to the accompanying drawings.

Figure 1A:
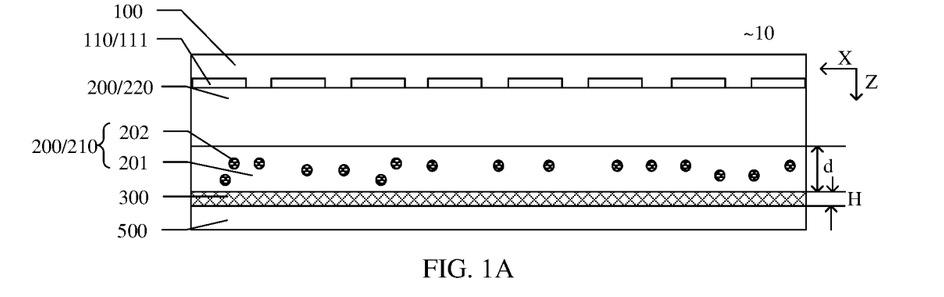
FIG. 1A is a partial structural schematic diagram of a touch panel according to an embodiment of the disclosure.

FIG. 1A is a partial structural schematic diagram of a touch panel according to an embodiment of the disclosure. As illustrated in FIG. 1A, the touch panel 10 comprises a touch substrate 100, a dielectric layer 200, and a conductive layer 300. The touch substrate 100 comprises a touch electrode layer 110. The touch electrode layer 110 comprises a two-dimensional touch electrode array. The two-dimensional touch electrode array comprises a plurality of sensing electrodes 111. The touch electrode layer 110 is configured to detect a touch position, i.e. detect a position of the touch panel 10 touched by the user; the conductive layer 300 is disposed opposite to the touch substrate 100, and the conductive layer 300 is configured to form capacitance with the touch electrode layer 110; the dielectric layer 200 is located between the control electrode layer 110 and the conductive layer 300, the dielectric layer 200 comprises a fluid dielectric layer 210 and a solid dielectric layer 220. A dielectric constant of the fluid dielectric layer 210 is larger than a dielectric constant of the solid dielectric layer 220, that is, the conductive layer 300 and the touch electrode layer 110 form a planar capacitor. The conductive layer 300 and the touch electrode layer 110 are respectively two plates of the planar capacitor, and the fluid dielectric layer 210 and the solid dielectric layer 220 are the medium located between the two plates. A fluid in the fluid dielectric layer 210 is configured to flow under the touch pressure to change the capacitance between the touch electrode layer and the conductive layer at the touch position and in the peripheral region of the touch position by changing the dielectric constant of the dielectric layer 200, and the capacitance variation is used to determine the touch pressure.

For example, the above embodiment is illustrated by an example in which the touch electrode layer comprises the two-dimensional touch electrode array. Because the touch electrode comprises the electrode array arranged in two-dimensions, capacitance values at different positions can be detected. However, the embodiments in accordance with the disclosure are not limited thereto, and the conductive layer 300 can also comprise a plurality of sub-electrodes arranged in a two-dimensional array.

For example, the fluid dielectric layer 210 is further configured to: under the touch pressure, the fluid in the fluid dielectric layer 210 at the touch position flows toward the peripheral region, so that the dielectric constant of the dielectric layer 200 at the touch position (refers to the total dielectric constant of all the film layers comprised in the dielectric layer) is decreased compared with that before the touch occurs, thereby causing the capacitance between the touch electrode layer 110 and the conductive layer 300 to be decreased. The dielectric constant of the dielectric layer 200 in the peripheral region is increased compared with that before the touch occurs, so that the capacitance between the touch electrode layer 110 and the conductive layer 300 is increased. Therefore, the touch panel 10 can determine the touch pressure according to the capacitance variation. The above peripheral region of the touch position refers to an region surrounding the touch position, and the peripheral region is defined by a condition that the capacitance between the touch electrode layer and the conductive layer is increased compared with that before the touch occurs, that is, in the direction from the touch position to the peripheral region, the capacitance between the touch electrode layer and the conductive layer (compared with that before the touch occurs) comprises three regions of decreased region, increased region and unchanged region, (touch position-peripheral region—region outside the peripheral region), and the peripheral region is the region where the capacitance is increased.

For example, in one embodiment of the disclosure, the fluid dielectric layer 210 is a liquid dielectric layer that can microscopically flow. The liquid dielectric layer can be manufactured by injecting a liquid between two film layers (or flexible substrates) and then packaging the two film layers. This embodiment is not limited thereto.

For example, the touch panel 10 according to the embodiment is a flexible touch panel, the solid dielectric layer 220 is a flexible film layer, and the flexible film layer is in contact with a surface of the liquid dielectric layer 210, that is, there is no air between the solid dielectric layer 220 and the liquid dielectric layers 210 (or the air can be negligible).

For example, the solid dielectric layer 220 is a flexible layer.

For example, as illustrated in FIG. 1A, the touch panel 10 can be bent in a direction indicated by the arrow in the Z direction under the touch pressure. It should be noted that "the touch panel 10 is a flexible touch panel" refers to at least the film layer between the fluid dielectric layer 210 and the touch electrode layer 110 is a flexible film layer.

The embodiment of the disclosure illustrates an example in which the solid dielectric layer 220 is located on a side of the fluid dielectric layer 210 facing the touch electrode layer 110, but is not limited thereto, and the solid dielectric layer 220 can also be located on a side of the touch electrode layer 110 away from the fluid dielectric layer 210.

On one hand, compared with a case of filling air between the touch electrode layer and the conductive layer, the touch panel according to the embodiment adopts filling a liquid dielectric layer between the touch electrode layer and the conductive layer, and it is not necessary to provide any special exhaust valve, thereby simplifying the process; on the other hand, the dielectric constant of the liquid dielectric layer is larger than the dielectric constant of the solid dielectric layer, and thus the touch panel comprising the liquid dielectric layer has better detection performance. For example, the dielectric constants of the liquid dielectric layer and the solid dielectric layer refer to the dielectric constants of the material of the liquid dielectric layer and the material of the solid dielectric layer. In addition, because the liquid dielectric layer is a liquid film layer, the liquid film layer is more suitable for a flexible touch panel, and the three-dimensional touch detection can be performed by using fluid mechanics. The liquid dielectric layer comprised in the touch panel according to the embodiment can be applied to the flexible touch panel to achieve the three-dimensional touch detection, thereby improving the human-computer interaction function, category, and manner of the touch panel.

For example, as illustrated in FIG. 1A, the liquid dielectric layer 210 comprises an electrolyte, that is, the liquid dielectric layer 210 can be an electrolyte layer.

For example, as illustrated in FIG. 1A, a solvent 201 of the electrolytic solution comprises acetonitrile and/or propylene carbonate, and a solute 202 of the electrolytic solution comprises a material such as tetraethylammonium tetrafluoroborate.

For example, as illustrated in FIG. 1A, a thickness d of the fluid dielectric layer 210 is in a range from 100 μm to 500 μm, that is, a thickness of the electrolyte layer is in a range from 100 μm to 500 μm.

For example, the thickness of the electrolyte layer can be in a range from 200 μm to 300 μm.

For example, the thickness of the electrolyte layer can be in a range from 120 μm to 500 μm.

The electrolyte layer according to the embodiment has a suitable thickness to absorb the pressure applied to the touch panel and has a good detection effect on the applied pressure.

For example, as illustrated in FIG. 1A, the conductive layer 300 is a metal layer.

For example, as illustrated in FIG. 1A, a thickness H of the conductive layer 300 in the direction perpendicular to the conductive layer 300 (the Z direction) is in a range from 100 μm to 300 μm.

For example, in an example of the embodiment, the material of the conductive layer 300 is gold foil, and when the thickness of the gold foil is 100 μm-300 μm, it has good flexibility, and can be used as a reference plane when the touch panel performs touch identifying in the Z direction.

For example, as illustrated in FIG. 1A, the touch electrode layer 110 according to the embodiment can comprise a self-capacitive touch electrode, and can also comprise a mutual-capacitive touch electrode.

For example, the touch electrodes of the two-dimensional touch array are self-capacitive touch electrodes, and all the touch electrodes can be configured as a layer of sensing electrodes to detect the capacitance between the touch electrodes and the conductive layer 300.

For example, the touch electrodes of the two-dimensional touch array are mutually capacitive touch electrodes, comprising the touch sensing electrodes and the touch driving electrodes, and the touch sensing electrodes are a layer of electrodes configured to detect the capacitance between the touch electrode layer 110 and the conductive layer 300, and the capacitance is the capacitance formed between the touch sensing electrodes and the conductive layer.

For example, as illustrated in FIG. 1A, a base substrate 500 is further comprised on a side of the conductive layer 300 away from the fluid dielectric layer 210.

Figure 1B:
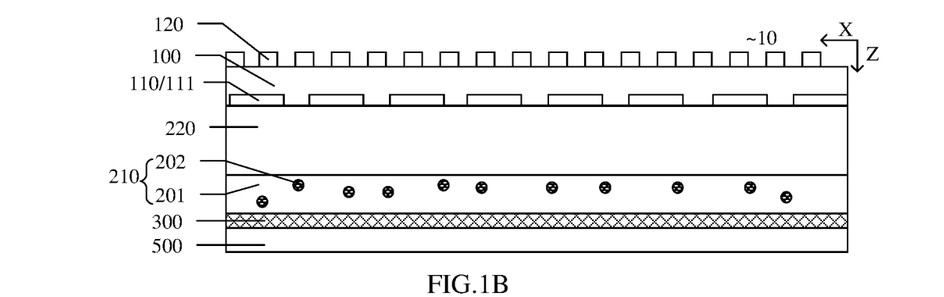
FIG. 1B is a partial structural schematic diagram of a touch panel according to an embodiment of the disclosure.

For example, FIG. 1B is a partial structural schematic diagram of a touch panel according to an embodiment of the disclosure. As illustrated in FIG. 1B, the touch panel 100 further comprises an organic light emitting diode 120, and the touch panel 10 is an organic light emitting diode touch display panel.

For example, one touch electrode corresponds to a plurality of pixel units, for example, 18×32 touch electrodes correspond to 1920×1080 pixels.

For example, when the touch panel 10 comprises a plurality of organic light emitting diodes 120, a display panel (not illustrated) comprising the organic light emitting diodes 120 can be polyethylene terephthalate (PET)/organic light emitting diode (OLED)/Polyethylene terephthalate (PET)/polarizing plate (POL), that is, the touch panel of the embodiment is a stacking structure of polyethylene terephthalate/organic light emitting diode/poly-p-phenylene ethylene glycol formate/polarizing plate/fluid dielectric layer/conductive layer/polyethylene terephthalate.

The embodiment illustrates an example in which the light emitting diode is located on the side of the touch electrode layer away from the fluid dielectric layer, but is not limited thereto. The light emitting diode can also be located between the touch electrode layer and the fluid dielectric layer, provided that the pressure touch detection is not affected.

The touch panel according to the embodiment of the disclosure can be a touch display panel, such as a flexible organic light emitting diode touch display panel. In the embodiment, the detection of pressure touch of the flexible organic light emitting diode touch display panel can be better implemented by providing the fluid dielectric layer, thereby achieving 3D touch detection.

Figure 2:
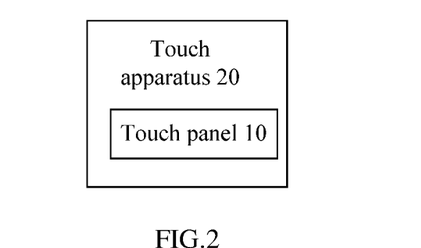
FIG. 2 is a schematic block diagram of a touch apparatus according to another embodiment of the disclosure.

FIG. 2 is a schematic block diagram of a touch apparatus according to another embodiment of the disclosure. As illustrated in FIG. 2, the touch apparatus 20 according to the embodiment of the disclosure comprises the touch panel 10 according to any of the above embodiments. The touch apparatus 20 according to the embodiment comprises a fluid dielectric layer, so that the three-dimensional touch detection can be better achieved.

For example, the touch apparatus 20 can be a touch display apparatus, for example, a liquid crystal touch display apparatus or an organic light emitting diode touch display apparatus etc., and any products or components having display touch function and including the touch display apparatus, such as a television set, a digital camera, a cell phone, a tablet, a laptop, a navigator, and the embodiment is not limited to this.

Figure 3A:
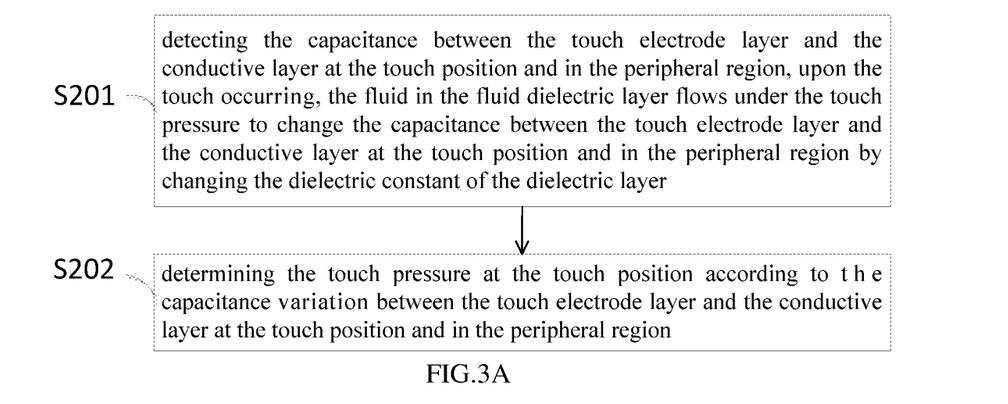
FIG. 3A is a schematic flowchart of a pressure touch detection method of a touch panel according to an embodiment of the disclosure.

FIG. 3A is a schematic flowchart of a pressure touch detection method of a touch panel according to an embodiment of the disclosure. As illustrated in FIG. 3A, the pressure touch detection method specifically comprises the following steps.

S201: detecting a capacitance between the touch electrode layer and the conductive layer at the touch position and in the peripheral region, wherein when the touch occurs, the fluid in the fluid dielectric layer flows under the touch pressure to change the capacitance between the touch electrode layer and the conductive layer at the touch position and in the peripheral region by changing the dielectric constant of the dielectric layer.

S202: determining the touch pressure at the touch position according to a capacitance variation between the touch electrode layer and the conductive layer at the touch position and in the peripheral region.

For example, detecting the capacitance between the touch electrode layer and the conductive layer at the touch position and in the peripheral region comprises: detecting the capacitance between the touch electrode layer and the conductive layer at the touch position as a first capacitance, and the first capacitance is decreased compared with that before the touch occurs, a capacitance variation amount of the first capacitance is a first capacitance variation amount; detecting the capacitance between the touch electrode layer and the conductive layer in the peripheral region as a second capacitance, and the second capacitance is increased compared with that before the touch occurs, and a capacitance variation amount of the second capacitance is the second capacitance variation amount.

For example, determining the touch pressure at the touch position according to the capacitance variation comprises: comparing the second capacitance variation amount with the first capacitance to obtain a capacitance ratio, and determining the touch pressure at the touch position according to the capacitance ratio.

For example, the touch position of the user on the touch apparatus is detected by the two-dimensional touch electrode array comprised in the touch electrode layer.

Figure 3B:
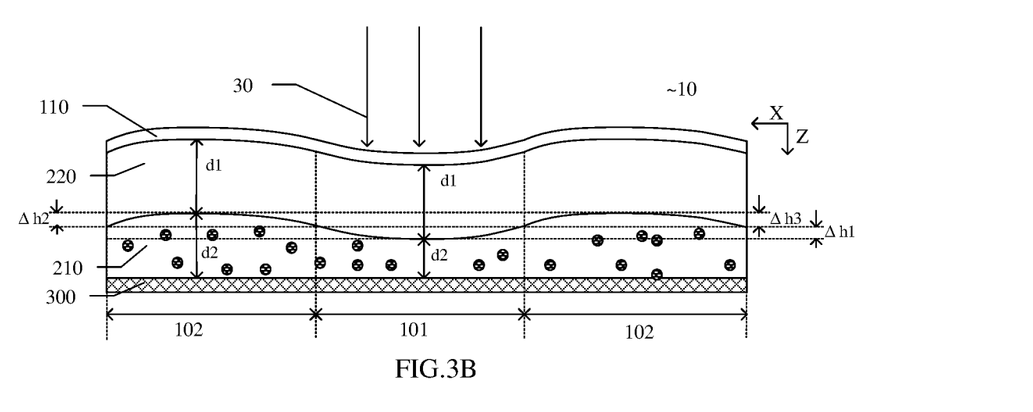
FIG. 3B is a schematic diagram of deformation of a touch panel applied with a pressure according to an embodiment of the disclosure.

For example, FIG. 3B is a schematic diagram of deformation of a touch panel applied with a pressure according to an embodiment of the disclosure, wherein the solid dielectric layer 220 is in direct contact with a surface of the fluid dielectric layer 210, and the fluid dielectric layer 210 is a layer of liquid dielectric layer.

Figure 3C:
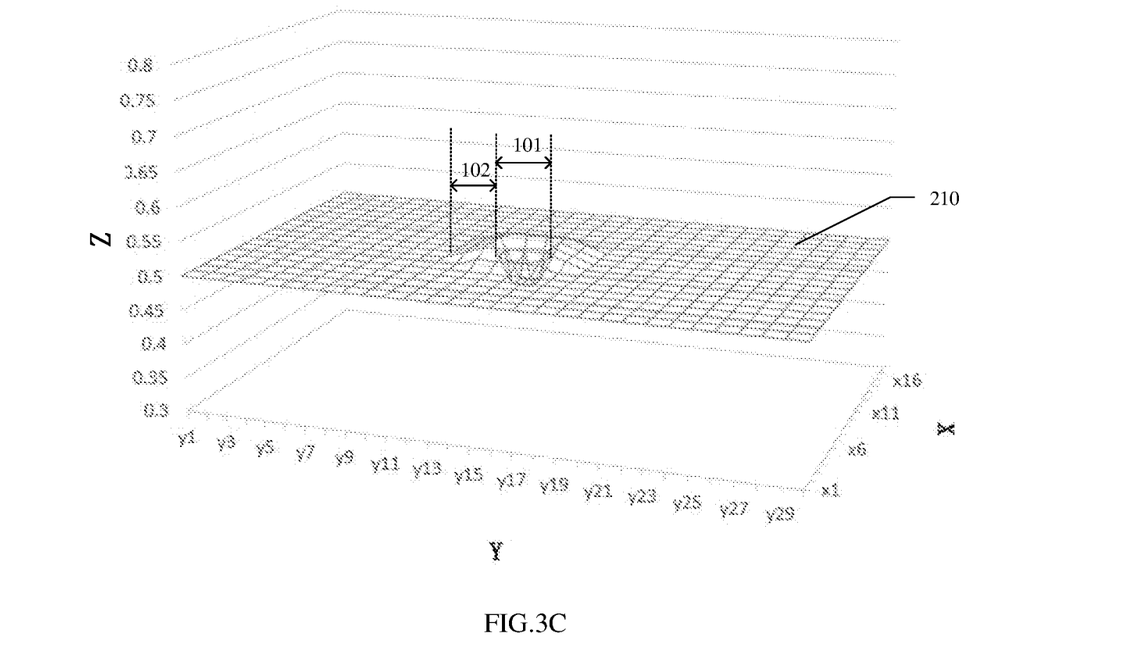
FIG. 3C is a schematic diagram showing the simulation of the touch condition of the fluid dielectric layer illustrated in FIG. 3B.

For convenience of illustration, FIG. 3B simply illustrates the touch electrode layer as a film layer. FIG. 3C is a schematic diagram showing the simulation of the touch condition of the fluid dielectric layer illustrated in FIG. 3B, that is, FIG. 3C is a schematic diagram of the simulation of the touch condition of the side surface of the fluid dielectric layer away from the conductive layer. The touch panel of the embodiment is a flexible touch panel. FIG. 3B only schematically showing a touch position and a peripheral region of the touch position.

For example, as illustrated in FIG. 3B and FIG. 3C, when the touch panel 30 is applied with the touch pressure 30 (the direction of the touch pressure 30 is the direction indicated by the arrow in the Z direction), the film layer such as the touch electrode layer 110 at the touch position 101 is bent towards the direction indicated by the arrow in the Z direction.

For example, at the touch position 101, the touch electrode layer 110 and the solid dielectric layer 220 are bent toward the side facing the fluid dielectric layer 210, so that the fluid dielectric layer 210 is subjected to the touch pressure 30 applied to the touch panel 10, which the causes a change in the fluid distribution, that is, at the touch position 101, the thickness of the fluid dielectric layer 210 is thinned, that is, the surface of the fluid dielectric layer 210 at the side away from the conductive layer 300 is recessed towards the side close to the conductive layer 300 (in the direction indicated by the arrow in the Z direction); in the peripheral region 102 of the touch position, the thickness of the fluid dielectric layer 210 is thickened, that is, the surface of the fluid dielectric layer 210 at the side away from the conductive layer 300 protrudes towards the side away from the conductive layer 300 (in the opposite direction to the direction indicated by the arrow in the Z direction). The embodiment illustrates an example in which the touch position 101 corresponds to a region where the thickness of the fluid dielectric layer 210 is thinned, and the peripheral region 102 of the touch position corresponds to a region where the thickness of the fluid dielectric layer 210 is thickened, but actually there may be some deviations, for example, a thickness of a small portion of the peripheral region of the touch position corresponding to the fluid dielectric layer is thinned compared with that before the touch occurs, but the capacitance at the position is increased, and therefore it should be divided as the peripheral region of the touch position.

Because of the fluid characteristics of the fluid dielectric layer 210, the fluid in the fluid dielectric layer 210 at the touch position 101 flows to the peripheral region 102 of the touch position due to the applied pressure, so that the fluid at the touch position 101 is reduced, and the fluid in the peripheral region 102 of the touch position is increased. Therefore, the surface of the fluid dielectric layer 210 at the side away from the conductive layer 300 at the touch position 101 and the surface of the fluid dielectric layer 210 at the side away from the conductive layer 300 in the peripheral region 102 of the touch position are changed in opposite directions, to achieve a dynamic balance on the pressure applied to the fluid dielectric layer 210.

The above-mentioned "recess" and "protrude" are relative to the surface of the fluid dielectric layer at the side away from the conductive layer when it is not subjected to the touch pressure applied to the touch panel 10, and the surface of the above "recessed" fluid dielectric layer at the side away from the conductive layer is lowered, and the surface of the "protruded" fluid dielectric layer at the side away from the conductive layer is raised. "The surface of the fluid dielectric layer at the side away from the conductive layer when it is not subjected to the touch pressure applied to the touch panel 10" herein can be a substantially flat surface when the entire flexible touch panel is not bent, and also can be the surface when the flexible touch panel is bent, and when the touch panel is bent, the macroscopic bending is much larger than the microscopic scale, and the reference baseline of the touch detection is constantly refreshed as the environment changes. The refresh process will account for environmental changes and noise (belonging to the optimization of the backend software), so the effect of deformation on the fluid dielectric layer when the touch panel is bent can be minimized by optimization.

For example, as illustrated in FIG. 3B and FIG. 3C, when the fluid dielectric layer 210 at the touch position 101 is subjected to the touch pressure applied to the touch panel 10 to generate a recess, the fluid dielectric layer 210 of the peripheral region 102 of the touch position generates a ring of protrusion surrounding the above recess, that is, a portion that surrounds the recesses in a state of rise in arc shape.

The embodiment illustrates an example in which the touch position is located in the non-edge region of the touch panel, but it is not limited to this. The touch position can also be located in an edge region of the touch panel. When the touch position is located in the edge region of the touch panel, the region surrounding the touch position is located on the side of the touch position close to the center of the touch panel, and half surrounds the touch position.

For example, as illustrated in FIG. 3B, because the touch electrode layer 110 located at the touch position 101 is subjected to the touch pressure 30 applied to the touch panel 10 and bent toward the side where the conductive layer 300 is located, the capacitance between the electrode layer 110 and the conductive layer 300 at the touch position 101 and the capacitance between the electrode layer 110 and the conductive layer 300 at the peripheral region 102 of the touch position are both changed, that is, the capacitance between the conductive layer 300 and the touch electrode layer 100 is changed both at the touch position 101 and at the peripheral region 102 of the touch position.

For example, detecting the capacitance variation amount between the touch electrode layer 110 and the conductive layer 300 comprises: before the touch occurs detecting an initial capacitance between the touch electrode layer 110 and the conductive layer 300; and after the touch occurs, subtracting the initial capacitance from the first capacitance and the second capacitance between the touch electrode layer 110 and the conductive layer 300 to obtain the capacitance variation amount. In the process of detecting the initial capacitance, environmental changes and noise are considered.

For example, the initial capacitances at different positions between the touch electrode layer 110 and the conductive layer 300 can be the same or different.

For example, the first capacitance C1 between the touch electrode layer 110 and the conductive layer 300 at the touch position 101 is detected by the touch electrode layer 110, and before the touch occurs. Compared with the first initial capacitance between the touch electrode layer and the conductive layer 300 at the touch position 101, the first capacitance C1 is decreased, and therefore, the first initial capacitance is subtracted from the detected first capacitance C1 to obtain a first capacitance variation amount $\Delta C1$.

For example, the second capacitance C2 (or C3) between the touch electrode layer 110 and the conductive layer 300 in the peripheral region 102 of the touch position is detected by the touch electrode layer 110, and the second capacitance between the touch electrode layer 110 and the conductive layer 300 at different positions in the peripheral region 102 of the touch position can be the same or different. The embodiment illustrates two capacitances C2 and C3 at two positions in the peripheral region 102 of the touch position illustrated in FIG. 3B.

For example, before the touch occurs, compared with the second initial capacitance between the touch electrode layer 110 and the conductive layer 300 in the peripheral region 102 of the touch position, the second capacitance C2 (or C3) is increased, and the second initial capacitance is subtracted from the detected second capacitance C2 (or C3) to obtain a second capacitance variation amount $\Delta C2$ (or $\Delta C3$). Because FIG. 3B is a schematic sectional diagram of the touch panel, when the touch position 101 is located in the non-edge region of the touch panel, the peripheral region 102 of the touch position is located on both sides of the first region along the X direction.

The above first capacitance can be a capacitance at any one of the touch positions. In actual circuit operation, the first capacitance is a synthesis of feedback results of a plurality of electrodes collectively detecting. Similarly, the second capacitance is also a synthesis of feedback results of a plurality of electrodes collectively detecting. For convenience of description of the disclosure, the first capacitance is regarded as the capacitance at the position where the thickness of the fluid dielectric layer at the touch position is the minimum, and the second capacitance is regarded as the capacitance at the touch position where the thickness of the fluid dielectric layer in the peripheral region of the touch position is the maximum. For example, when performing pressure detection, the touch pressure can also be calculated by comparing the capacitance corresponding to each electrode at the touch position and the peripheral position, selecting the minimum capacitance value at the touch position and the maximum capacitance value of the peripheral region.

For example, as illustrated in FIG. 3B, the dielectric constant between the touch electrode layer 110 and the conductive layer 300 is a total dielectric constant of the film layers mixing in the dielectric layer in proportion. According to the calculation formula of the total dielectric constant: $\varepsilon=(d1*\varepsilon_{solid\ dielectric\ layer}+d2*\varepsilon_{fluid\ dielectric\ layer})/(d1+d2)$, when $\varepsilon_{solid\ dielectric\ layer} < \varepsilon_{fluid\ dielectric\ layer}$, d2 is decreased, and d1 is unchanged, $\varepsilon$ is decreased. Therefore, when the surface of the fluid dielectric layer 210 on the side away from the conductive layer 300 at the touch position 101 is lowered by the height $\Delta h1$, the dielectric constant $\varepsilon 1$ of the dielectric layer between the touch electrode layer 110 and the conductive layer 300 at the touch position 101 is lowered by $\Delta \varepsilon 1$. The larger the decreased height $\Delta h1$ of the surface of the fluid dielectric layer 210 on the side away from the conductive layer 300 is (the smaller d2 is), the larger the $\Delta \varepsilon 1$ by which the dielectric constant $\varepsilon 1$ is decreased is, that is, $\Delta \varepsilon_1 \propto \Delta h1$.

For example, when each of the fluid dielectric layer and the solid dielectric layer comprises a plurality of layers, the respective total dielectric constants thereof can also be calculated with reference to the above calculation formula of the total dielectric constant.

Similarly, according to the calculation formula of the total dielectric constant, when d2 is increased and d1 is unchanged, $\varepsilon$ is increased, and therefore, when the surface of the fluid dielectric layer 210 on the side away from the conductive layer 300 in the peripheral region 102 of the touch position is raised by the height $\Delta h2$ (or $\Delta h3$), the dielectric constant $\varepsilon 2$ (or $\varepsilon 3$) of the dielectric layer between the touch electrode layer 110 and the conductive layer 300 in the peripheral region 102 of the touch position is increased by $\Delta \varepsilon 2$ (or $\Delta \varepsilon 3$). The larger the value of the height $\Delta h2$ (or $\Delta h3$) by which the surface of the fluid dielectric layer 210 on the side away from the conductive layer 300 is raised is, the larger the $\Delta \varepsilon 2$ (or $\Delta \varepsilon 3$) by which the dielectric constant $\varepsilon 2$ (or $\varepsilon 3$) is increased is, that is, $\Delta \varepsilon 2$ (or $\Delta \varepsilon_3) \propto \Delta h2$ (or $\Delta h3$).

For example, the pressure applied to the fluid dielectric layer 210 satisfies the formula $F=\rho*g*(\Delta V)$, where $\rho$ is the density of the fluid dielectric layer 210 and $\Delta V$ can be the entire volume of a portion protruded from the fluid dielectric layer 210 or can also be the entire volume of a portion recessed from the fluid dielectric layer 210.

As the applied pressure F is larger, the volume $\Delta V$ of the portion protruded from the fluid dielectric layer 210 of the peripheral region 102 of the touch position is larger, and in this way, the height $\Delta h2$ (or $\Delta h3$) protruded from the fluid dielectric layer 210 of the peripheral region 102 of the touch position is higher, and therefore, $\Delta h2$ (or $\Delta h3) \propto \Delta V$. According to the relationship between the $\Delta \varepsilon_2$ (or $\Delta \varepsilon_3$) by which the dielectric constant $\varepsilon_2$ (or $\varepsilon_3$) is raised and the height constant $\varepsilon$ enprotruded from the fluid dielectric layer 210, and the relationship between the height $\Delta h2$ (or $\Delta h3$) protruded from the fluid dielectric layer 210 and the volume $\Delta V$ of the portion protruded from the fluid dielectric layer 210, it can be obtained that the larger the volume $\Delta V$ of the portion protruded from the fluid dielectric layer 210 is, the larger $\Delta \varepsilon_2$ (or $\Delta \varepsilon_3$) by the dielectric constant $\varepsilon_2$ (or $\varepsilon_3$) is increased is, that is, $s \varepsilon_2$ (or $\Delta \varepsilon_3) \propto \Delta V$, so that the relationship between the $\Delta \varepsilon_2$ (or $\Delta \varepsilon_3$) by which the dielectric constant $\varepsilon_2$ (or $\varepsilon_3$) is increased and the applied pressure F is: $\Delta \varepsilon_2$ (or $\Delta \varepsilon_3) \propto F$.

Similarly, as the applied pressure F is larger, the reduced volume $\Delta V$ of the portion recessed from the fluid dielectric layer 210 at the touch position 101 is larger, and in this way the lowered height $\Delta h1$ of the portion recessed from the fluid dielectric layer 210 at the touch position 101 is larger, and therefore, $\Delta h1 \propto \Delta V$. According to the relationship between the decreased $\Delta \varepsilon_1$ of the dielectric constant $\varepsilon_1$ and the height $\Delta h1$ of the portion recessed from the fluid dielectric layer 210, the relationship between the lowered height ionshiptrportion recessed from the fluid dielectric layer 210 and the decreased volume $\Delta V$ of the portion recessed from the fluid dielectric layer 210, it can be obtained that the larger the decreased volume $\Delta V$ of the portion recessed from the fluid dielectric layer 210 is, the larger the $\Delta \varepsilon_1$ by which the dielectric constant $\varepsilon_1$ is decreased is, that is, $\Delta \varepsilon_1 \propto \Delta V$, so that the relationship between o$\varepsilon_1$ by which the dielectric constant $\varepsilon_1$ is decreased and the applied pressure F is: $\Delta \varepsilon_1 \propto F$.

For example, as illustrated in FIG. 3B, at the touch position 101, because the touch electrode layer 110 is bent toward the side close to the conductive layer 300 by the applied touch pressure 30, the distance (d1+d2) between the touch electrode layer 110 and the conductive layer 300 is decreased, that is, the thickness (d1+d2) of the dielectric layer is decreased, and a decreasing ratio of the dielectric constant ε of the dielectric layer is larger than the decreasing ratio of thickness of the dielectric layer (d1+d2). Therefore, according to the relationship between the capacitance, the dielectric constant ε, and the distance (d1+d2) between the touch electrode layer 110 and the conductive layer 300 in the calculation formula of the capacitance of the planar capacitor C=K*ε/(d1+d2) (where K is a constant), it can be known that the first capacitance C1 between the touch electrode layer 110 and the conductive layer 300 at the touch position 101 is decreased, and the first capacitance variation amount ΔC1 is relatively small.

Assuming that the fluid dielectric layer (i.e., the liquid dielectric layer) has a dielectric constant of 70 and a thickness of 100 microns, and the solid dielectric layer has a dielectric constant of 4 and a thickness of 1000 microns.

The thickness of the fluid dielectric layer 210 at the touch position 101 is compressed by half, then:

Before the touch occurs: $\varepsilon_1$=(70*100+4*1000)/(100+1000)=10, C1=10K/(100+1000)=0.00909K;

After the touch occurs: $\varepsilon_1$=(70*50+4*1000)/(50+1000)=7.143, C1=7.143K/(50+1000)=0.0068K.

Similarly, because the distance between the touch electrode layer 110 and the conductive layer 300 in the peripheral region 102 of the touch position is increased, an increasing ratio of the dielectric constant $\varepsilon_2$ (or $\varepsilon_3$) of the dielectric layer is larger than a increasing ratio of the distance between the electrode layer 110 and the conductive layer 300, according to the relationship of the capacitance, the dielectric constant, and the thickness of the dielectric layer (the distance between the conductive layer and the touch electrode layer) of the calculation formula of the capacitance of the planar capacitor, it can be known that the second capacitance C2 (or C3) between the touch electrode layer 110 and the conductive layer 300 in the peripheral region 102 of the touch position is positively proportional to the value of the touch pressure, and thus the second capacitance variation amount ΔC2 (or ΔC3) is positively proportional to the value of the touch pressure.

Assuming that the dielectric layer has a dielectric constant of 70 and a thickness of 100 microns, and the solid dielectric layer has a dielectric constant of 4 and a thickness of 1000 microns.

The thickness of the liquid dielectric layer 210 of the peripheral region 102 of the touch position is raised by a quarter, then:

Before the touch occurs: $\varepsilon_1$=(70*100+4*1000)/(100+1000)=10, C2=10K/(100+1000)=0.00909K;

After the touch occurs: $\varepsilon_1$=(70*125+4*1000)/(125+1000)=11.33, C2=11.33K/(125+1000)=0.01K.

According to the proportional relationship between the dielectric constant between the touch electrode layer 110 and the conductive layer 300, and the applied pressure, it can be known that the first capacitance C1 is inversely proportional to the value of the pressure applied to the touch panel 10, and the second capacitance C2 (or C3) and the second capacitance variation amount ΔC2 (or ΔC3) is positively proportional to the value of the pressure applied to the touch panel 10. Therefore, the larger the applied touch pressure 30 is, the larger the second capacitance C2 (or C3) between the touch electrode layer 110 and the conductive layer 300 in the peripheral region 102 of the touch position and the second capacitance variation amount ΔC2 (or ΔC3) are; the larger the touch pressure 30 is, the smaller the first capacitance C1 between the touch electrode layer 110 and the conductive layer 300 at the touch position 101 is.

Figure 4:
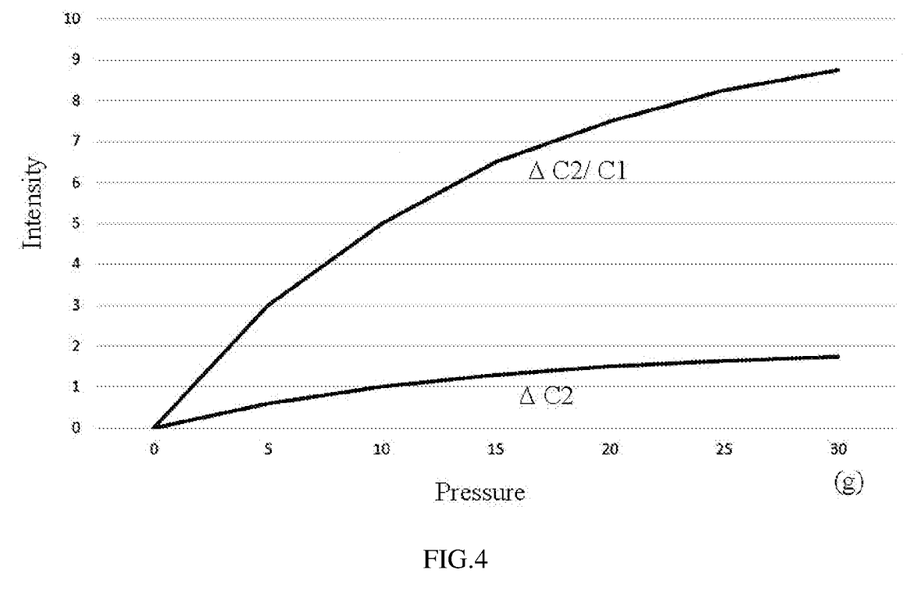
FIG. 4 is a graph illustrating a relationship between a second capacitance variation amount and a capacitance ratio of a second capacitance variation amount to a first capacitance versus an applied pressure according to an embodiment of the disclosure.

For example, FIG. 4 is a graph showing a relationship of a second capacitance variation amount and a capacitance ratio of a second capacitance variation amount to a first capacitance versus an applied touch pressure according to an embodiment of the disclosure. As illustrated in FIG. 4, the abscissa of the graph indicates the touch pressure applied to the touch panel, and the ordinate of the graph schematically shows the change range of the second capacitance variation amount and the change range of the capacitance ratio. The second capacitance variation amount ΔC2 is positively proportional to the value of the pressure F, that is, the second capacitance variation amount ΔC2 between the touch electrode layer and the conductive layer in the second region is increased, as the touch pressure applied to the touch panel increases.

For example, as illustrated in FIG. 4, because the first capacitance C1 is inversely proportional to the value of the touch pressure F and the second capacitance variation amount ΔC2 is positively proportional to the value of the touch pressure F, the capacitance ratio ΔC2/C1 of the second capacitance variation amount ΔC2 to the first capacitance C1 is positively proportional to the value of the pressure F, that is, as the pressure applied to the touch panel increases, the capacitance ratio ΔC2/C1 is increased.

For example, as illustrated in FIG. 4, when the value of the touch pressure is 5 g, the intensity of the capacitance ratio ΔC2/C1 is 3 times larger than the second capacitance variation amount ΔC2; when the value of the touch pressure is 10 g, the intensity of the capacitance ratio ΔC2/C1 is approximately 5 times larger than the second capacitance variation amount ΔC2. As the value of the touch pressure increases, the change of the capacitance ratio ΔC2/C1 is more and more obvious than the second capacitance variation amount ΔC2.

Compared with the relationship between the second capacitance variation amount ΔC2 and the touch pressure F, the relationship graph between the capacitance ratio obtained by the second capacitance variation amount ΔC2 and the first capacitance C1 and the touch pressure F can increase the amplitude value of the ordinate, that is, the relationship graph between the capacitance ratio obtained by calculating the ratio of the second capacitance variation amount ΔC2 to the first capacitance C1, and the touch pressure F, can more clearly show that the capacitance ratio is positively proportional to the value of the touch pressure.

In the embodiment, before determining the touch pressure at the touch position, it further comprises determining the touch pressure at the touch position according to a positive proportional relationship between the capacitance ratio and the value of the touch pressure.

For example, according to the positive proportional relationship between the pressure and the capacitance ratio illustrated in FIG. 4, a fitting function of the capacitance ratio and the value of the touch pressure can be established, or a lookup table of the capacitance ratio and the value of the touch pressure can be established.

For example, according to the positive proportional relationship between the capacitance ratio and the value of the touch pressure, the detected plurality of capacitance ratios are sequentially divided into a plurality of capacitance ratio ranges from small to large, and the values of the touch pressure corresponding to the capacitance ratios are divided into a plurality of touch pressure levels from small to large, and the plurality of capacitance ratio ranges are in a one-to-one correspondence with the plurality of touch pressure levels.

For example, the plurality of the capacitance ratios are sequentially divided into a first capacitance ratio range, a second capacitance ratio range, and a third capacitance ratio range, and the values of the touch pressure corresponding to the capacitance ratios are divided into touch levels, such as tap touch level, light press touch level and heavy press touch level, that is, the capacitance ratios comprised in the first capacitance ratio range correspond to the values of the touch pressure comprised in the tap touch level, and the capacitance ratios comprised in the second capacitance ratio range correspond to the values of the touch pressure comprised in the light press touch level, and the capacitance ratios comprised in the third capacitance ratio range correspond to the values of the touch pressure comprised in the heavy press touch level.

For example, the pressure touch detection method of the touch panel according to the embodiment further comprises: determining a touch pressure level with which the touch apparatus is applied according to the capacitance ratio range.

For example, when it is detected that the capacitance ratio between the touch electrode layer and the conductive layer satisfies the first capacitance ratio range, it can be determined that the touch pressure with which the touch panel is applied is the tap touch level, and so on, when the touch electrode detects that the capacitance ratio between the touch electrode layer and the conductive layer satisfies the second capacitance ratio range, it can be determined that the touch pressure with which the touch panel is applied is the light press touch level; when the touch electrode detects the capacitance ratio between the touch electrode layer and the conductive layer satisfies the third capacitance ratio range, it can be determined that the touch pressure with which the touch panel is applied is the heavy pressed touch level, and thus the touch panel according to the embodiment can respond to corresponding operations according to the pressing force to improve the human-computer interaction function, category and manner of the touch panel.

Figure 5A:
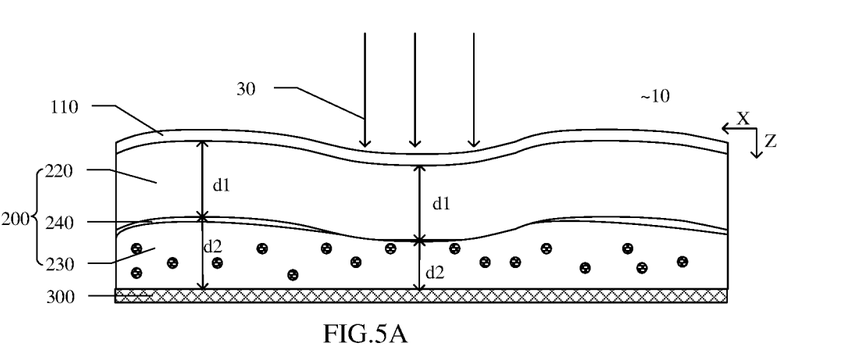
FIG. 5A is a schematic diagram of deformation of a touch panel upon being applied with pressure according to another embodiment of the disclosure.

For example, FIG. 5A is a partial structural schematic diagram of a touch panel according to another embodiment of the disclosure. The difference from the embodiment illustrated in FIG. 3B is that, as illustrated in FIG. 5A, in the embodiment, the touch panel 10 is a flexible touch panel, the solid dielectric layer 220 is a flexible film layer, and the fluid dielectric layer comprises a liquid dielectric layer 230 and an air layer 240. The air layer 240 is located on a side of the liquid dielectric layer 230 facing the touch electrode layer 110, i.e. before the touch occurs, the air layer 240 is in contact with the surface of the liquid dielectric layer 230 facing the touch electrode layer 110, and the dielectric constant of the air layer 240 is smaller than the dielectric constant of the liquid dielectric layer 230.

For example, when the touch pressure 30 is applied to the touch panel 10, at the touch position, the solid dielectric layer 220 presses the air layer 240 to flow the air to the peripheral region of the touch position until the solid dielectric layer 220 is in contact with the liquid dielectric layer 230. After the solid dielectric layer 220 is in contact with the liquid dielectric layer 230, the solid dielectric layer 220 is subjected to the touch pressure 30 so that a recess is generated on the surface of the liquid dielectric layer 230 at the touch position, and the thickness of the liquid dielectric layer is decreased, that is, the liquid in the liquid dielectric layer 230 flows towards the periphery region.

Before the touch occurs, the air layer 240 is comprised between the touch electrode layer 110 and the conductive layer 300 at the touch position, and after the touch occurs, the air layer is not comprised between the touch electrode layer 110 and the conductive layer 300 at the touch position. According to the formula of the mixed dielectric constant and the calculation formula of the capacitance, it is assumed that the liquid dielectric layer has the dielectric constant of 70 and the thickness of 100 µm, the solid dielectric layer has the dielectric constant of 4 and the thickness of 1000 µm, and the air layer has the dielectric constant of 1 and the thickness of 10 µm.

The thickness of the liquid dielectric layer 230 at the touch position 101 is compressed by half, then:

Before the touch occurs: $\varepsilon_1=(70*100+4*1000+1*10)/(100+1000+10)=9.9189$, $C1=9.9189K/(100+1000+10)=0.00894K$;

After the touch occurs: $\varepsilon_1=(70*50+4*1000)/(50+1000)=7.143$, $C1=7.143K/(50+1000)=0.0068K$.

Therefore, at the touch position, the thickness of the liquid dielectric layer 230 is thinned so that both the dielectric constant and the thickness of the dielectric layer between the touch electrode layer 110 and the conductive layer 300 are decreased, and the decreasing ratio of the dielectric constant is larger than the decreasing ratio of the thickness of the dielectric layer between the touch electrode layer 110 and the conductive layer 300, so that the first capacitance is decreased compared with that before the touch occurs.

Similarly, the thickness of the liquid dielectric layer 230 between the touch electrode layer 110 and the conductive layer 300 in the peripheral region of the touch position is thickened compared with that before the touch occurs, and the thickness of the solid dielectric layer 220 does not change. Therefore, the distance between the touch electrode layer 110 and the conductive layer 300 is increased. According to the formula of the total dielectric constant and the calculation formula of the capacitance, it is assumed that the liquid dielectric layer has the dielectric constant of 70 and the thickness of 100 µm, the solid dielectric layer has the dielectric constant of 4 and the thickness of 1000 µm, and the air layer has the electrical constant of 1 and the thickness of 10 µm.

In the peripheral region of the touch position, the thickness of the liquid dielectric layer 230 is raised by a quarter, and the thickness of the air layer 240 is compressed by half, then:

Before the touch occurs: $\varepsilon_1=(70*100+4*1000+1*10)/(100+1000+10)=9.9189$, $C2=9.9189K/(100+1000+10)=0.00894K$;

After the touch occurs: $\varepsilon_1=(70*125+4*1000+1*5)/(125+1000+5)=11.288$, $C2=11.288K/(125+1000+5)=0.00999K$.

Therefore, in the peripheral region of the touch position, the thickness of the liquid dielectric layer 230 is thickened to increase the dielectric constant and thickness of the dielectric layer between the touch electrode layer 110 and the conductive layer 300, and the increasing ratio of the dielectric constant is larger than the increasing ratio of the thickness of the dielectric layer between the touch electrode layer 110 and the conductive layer 300, so that the second capacitance is increased compared with that before the touch occurs.

According to the proportional relationship between the dielectric constant between the touch electrode layer 110 and the conductive layer 300 and the applied pressure, it can be known that the first capacitance is inversely proportional to the value of the pressure applied to the touch panel 10 of the touch apparatus, and the second capacitance and the second capacitance variation amount are positively proportional to the value of the pressure applied to the touch panel 10 of the touch apparatus. Therefore, the capacitance ratio of the second capacitance variation amount to the first capacitance is positively proportional to the value of the pressure, that is, as the pressure applied to the touch panel is increased, the capacitance ratio is also increased.

Figure 5B:
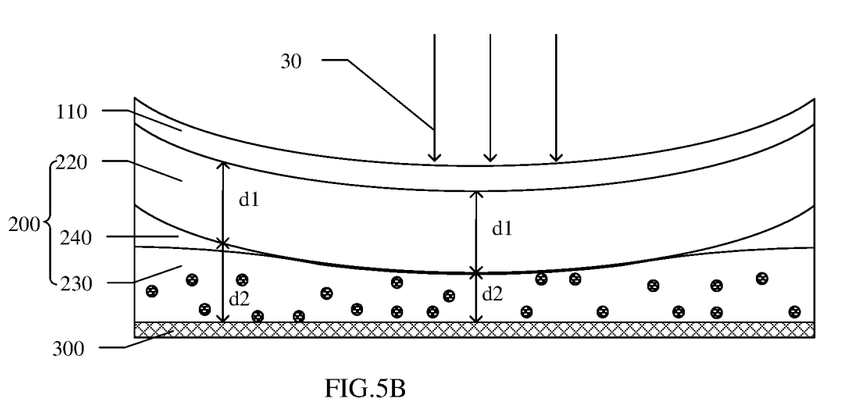
FIG. 5B is a schematic diagram of deformation of a touch panel upon being applied with a pressure according to another embodiment of the disclosure.

For example, FIG. 5B is a partial structural schematic diagram of a touch apparatus according to another embodiment of the disclosure. The difference from the embodiment illustrated in FIG. 3B is that, as illustrated in FIG. 5B, the touch panel 10 of the embodiment is a rigid touch panel, the solid dielectric layer 220 is a rigid film layer, and the fluid dielectric layer comprises a liquid dielectric layer 230 and an air layer 240. The air layer 240 is located on a side of the liquid dielectric layer 230 facing the touch electrode layer 110, that is, before the touch occurs, the air layer 240 is in contact with the surface of the liquid dielectric layer 230 facing the touch electrode layer 110, and the dielectric constant of the air layer 240 is smaller than the dielectric constant of the liquid dielectric layer 230.

For example, when the touch pressure 30 is applied to the touch panel, at the touch position, the solid dielectric layer 220 presses the air layer 240 to flow the air to the periphery of the touch position until the solid dielectric layer 220 is in contact with the liquid dielectric layer 230. After the solid dielectric layer 220 is in contact with the liquid dielectric layer 230, the solid dielectric layer 220 is subjected to the touch pressure 30 so that a recess is generated on the surface of the liquid dielectric layer 230 at the touch position, and the thickness of the liquid dielectric layer is reduced, that is, the liquid in the liquid dielectric layer 230 flows to the periphery region.

Before the touch occurs, the air layer 240 is comprised between the touch electrode layer 110 and the conductive layer 300 at the touch position, and after the touch occurs, the air layer is not comprised between the touch electrode layer 110 and the conductive layer 300 at the touch position. According to the formula of the total dielectric constant and the calculation formula of the capacitance, it is assumed that the liquid dielectric layer has the dielectric constant of 70 and the thickness of 100 μm, the solid dielectric layer has the dielectric constant of 4 and the thickness of 1000 μm, and the air layer has the electrical constant of 1 and the thickness of 10 μm.

The thickness of the liquid dielectric layer 230 at the touch position 101 is compressed by a quarter, then:

Before the touch occurs: $\varepsilon_1=(70*100+4*1000+1*10)/(100+1000+10)=9.9189$, $C1=9.9189K/(100+1000+10)=0.00894K$;

After the touch occurs: $\varepsilon_1=(70*85+4*1000)/(85+1000)=9.171$, $C1=9.171K/(85+1000)=0.00845K$.

Therefore, at the touch position, the thickness of the liquid dielectric layer 230 is thinned so that the dielectric constant and the thickness of the dielectric layer between the touch electrode layer 110 and the conductive layer 300 is decreased, and the decreasing ratio of the dielectric constant is larger than the decreasing ratio of the thickness of the dielectric layer between the touch electrode layer 110 and the conductive layer 300, so that the first capacitance is decreased compared with that before the touch occurs.

Because the touch panel 10 of the embodiment is the rigid touch panel, the distance between the touch electrode layer 110 and the conductive layer 300 in the peripheral region of the touch position is decreased compared with that before the touch occurs, that is, the thickness of the dielectric layer 200 between the touch electrode layer 110 and the conductive layer 300 in the peripheral region of the touch position is decreased.

According to the formula of the total dielectric constant and the calculation formula of the capacitance, it is assumed that the liquid dielectric layer has the dielectric constant of 70 and the thickness of 100 μm, the solid dielectric layer has the dielectric constant of 4 and the thickness of 1000 μm, and the air layer has the dielectric constant of 1 and the thickness of 10 μm.

In the peripheral region of the touch position, the thickness of the liquid dielectric layer 230 is increased by one twentieth, and the thickness of the air layer 240 is compressed by four fifths.

Before the touch occurs: $\varepsilon_1=(70*100+4*1000+1*10)/100+1000+10)=9.9189$, $C2=9.9189K/(100+1000+10)=0.00894K$;

After the touch occurs: $\varepsilon_1=(70*105+4*1000+1*2)/(105+1000+2)=10.255$, $C2=10.255K/(105+1000+2)=0.00926K$.

Therefore, in the peripheral region of the touch position, the thickness of the liquid dielectric layer 230 is thickened to increase the dielectric constant of the dielectric layer between the touch electrode layer 110 and the conductive layer 300, and the thickness of the dielectric layer between the touch electrode layer 110 and conductive layer 300 is decreased, so that the second capacitance is increased compared with that before the touch occurs.

According to the proportional relationship between the dielectric constant between the touch electrode layer 110 and the conductive layer 300 and the value of the applied pressure, the first capacitance is inversely proportional to the value of the pressure applied to the touch panel of the touch apparatus, the second capacitance and the second capacitance variation amount are positively proportional to the value of the pressure applied to the touch panel of the touch apparatus. Therefore, the capacitance ratio of the second capacitance variation amount to the first capacitance is positively proportional to the value of the pressure, that is, as the pressure applied to the touch panel is increased, the capacitance ratio is also increased.

Some examples of the thickness of the air layer and the liquid dielectric layer are given above; however, embodiments according to the disclosure are not limited thereto. For example, in order to make the dielectric constant of the total dielectric layer change significantly before and after the application of the touch pressure, it can be set that when the touch pressure is not applied, the dielectric constant $\varepsilon_{air}$ of the air layer, the dielectric constant $\varepsilon_{liquid}$ of the dielectric layer, the thickness $d_{air}$ of the air layer and the thickness $d_{liquid}$ of the liquid dielectric layer satisfy the following relationship:

$$10 \times d_{air} \times \varepsilon_{air} \geq d_{liquid} \times \varepsilon_{liquid} \geq 5 \times d_{air} \times \varepsilon_{air}$$

Figure 6:
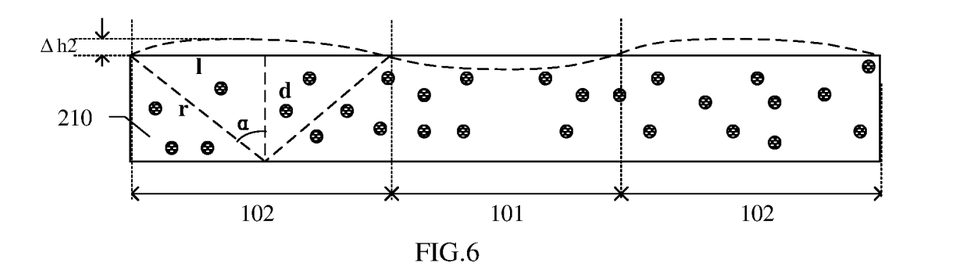
FIG. 6 is a schematic diagram of the liquid dielectric layer illustrated in FIG. 3B.

For example, the thickness range of the fluid dielectric layer 210 of the embodiment of the disclosure can also be determined according to the applied pressure. FIG. 6 is a schematic diagram of the fluid dielectric layer illustrated in FIG. 3B, and simply illustrates the geometric relationship of various positions of the fluid dielectric layer 210 of the peripheral region 102 of the touch position.

For example, as illustrated in FIG. 6, Δh2 is the height of the portion protruded from the side of the fluid dielectric layer 210 away from the conductive layer at the periphery region 102 of the touch region, and an entire section of the protruded fluid dielectric layer 210 in the peripheral region 102 of the touch position can have a fan shape, and a radius of the fan shape is r. When no pressure is applied, the thickness of the fluid dielectric layer 210 is d, and a half of the distance between the two intersections of two radii and the arc of the fan shape is l, a half of the angle between the two radii of the fan shape is α, and the value of α is relatively small. According to the geometric relationship, the following formula can be obtained:

$$r = d + \Delta h2$$

$$\alpha = \sin\alpha = \frac{\sqrt{(\Delta h2)^2 + 2d(\Delta h2)}}{d + \Delta h2},$$

$$l = r \times \sin\alpha = \sqrt{(\Delta h2)^2 + 2d(\Delta h2)},$$

$$S_{up} = S - S_{triangle} = \alpha r^2 - ld = h\sqrt{(\Delta h2)^2 + 2d(\Delta h2)}.$$

The calculation formula including $S_{up}$ represents the area of the fan shape minus the area of the triangle, to obtain the area of the section of the portion protruded from the fluid dielectric layer 210.

The pressure applied to the touch panel is in the range of 0.1 kg-0.8 kg, according to the formula:

$$0.1 \text{ g} < \int_0^{2\pi} \rho g S_{up} \cdot d\theta < 0.8 \text{ g},$$

it can be obtained that:

$$\frac{\left(\frac{0.1}{2\pi\rho(\Delta h2)}\right)^2 - (\Delta h2)^2}{2(\Delta h2)} < d < \frac{\left(\frac{0.8}{2\pi\rho(\Delta h2)}\right)^2 - (\Delta h2)^2}{2(\Delta h2)}.$$

According to the above calculation formula, because Δh2 is related to the magnitude of the applied pressure, the relationship between the thickness of the fluid dielectric layer 210 and the applied pressure can be obtained according to the above formula, and the thickness of the fluid dielectric layer 210 can be set according to the above relationship formula.

For example, in the above embodiment, although the touch electrode layer is configured to detect the touch position, the embodiment according to the disclosure is not limited thereto. It is also possible that the touch electrode layer is not an electrode for detecting a touch position. Therefore, the embodiment of the disclosure can also detect the touch pressure separately.

The following statements should be noted:

(1) Unless otherwise defined, the same reference sign represents the same meaning in the embodiments of the disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

What are described above is the embodiments of the disclosure only and not limitative to the scope of the disclosure; any of those skilled in related arts can easily conceive variations and substitutions in the technical scopes disclosed by the disclosure, which should be encompassed in protection scopes of the disclosure. Therefore, the scopes of the disclosure should be defined in the appended claims.

The invention claimed is:

1. A touch panel, comprising:
a touch electrode layer;
a conductive layer, disposed opposite to the touch electrode layer and configured to form capacitance with the touch electrode layer;
a dielectric layer, located between the touch electrode layer and the conductive layer, the dielectric layer comprising a fluid dielectric layer and a solid dielectric layer, the fluid dielectric layer having a dielectric constant larger than that of the solid dielectric layer, a fluid in the fluid dielectric layer being configured to flow under a touch pressure to change the capacitance between the touch electrode layer and the conductive layer at a touch position and in a peripheral region of the touch position by changing a dielectric constant of the dielectric layer, and a capacitance variation being used to determine the touch pressure.

2. The touch panel according to claim 1, wherein the fluid dielectric layer is further configured to: under the touch pressure, the fluid in the fluid dielectric layer at the touch position flows to the peripheral region so that the dielectric constant of the dielectric layer at the touch position is decreased compared with that before the touch occurs, causing the capacitance between the touch electrode layer and the conductive layer at the touch position to be decreased, and the dielectric constant of the dielectric layer in the peripheral region is increased compared with that before the touch occurs, causing the capacitance between the touch electrode layer and the conductive layer in the peripheral region to be increased.

3. The touch panel according to claim 1, wherein at least one of the touch electrode layer and the conductive layer comprises a plurality of sub-electrodes arranged in a two-dimensional array.

4. The touch panel according to claim 3, wherein the touch electrode layer is configured to detect the touch position.

5. The touch panel according to claim 1, wherein the touch panel is a flexible touch panel.

6. The touch panel according to claim 1, wherein the solid dielectric layer is a flexible layer.

7. The touch panel according to claim 5, wherein the fluid dielectric layer is a liquid dielectric layer, and the solid dielectric layer is in contact with a surface of the liquid dielectric layer.

8. The touch panel according to claim 1, wherein the fluid dielectric layer comprises a liquid dielectric layer and an air layer, the air layer is located on a side of the liquid dielectric layer facing the touch electrode layer, and a dielectric constant of the air layer is smaller than that of the liquid dielectric layer.

9. The touch panel according to claim 8, wherein, upon the touch pressure being not applied, the dielectric constant $\varepsilon_{air}$ of the air layer, the dielectric constant $\varepsilon_{liquid}$ of the liquid dielectric layer, a thickness $d_{air}$ of the air layer and a thickness $d_{liquid}$ of the liquid dielectric layer satisfy the following relationship:

$$10 \times d_{air} \times \varepsilon_{air} \geq d_{liquid} \times \varepsilon_{liquid} \geq 5 \times d_{air} \times \varepsilon_{air}.$$

10. The touch panel according to claim 7, wherein the liquid dielectric layer comprises an electrolyte, a solvent of the electrolyte comprises acetonitrile and/or propylene carbonate, and a solute of the electrolyte comprises tetraethylammonium tetrafluoroborate.

11. The touch panel according to claim 1, wherein the conductive layer is a gold foil layer, and a thickness of the gold foil layer is in a rage from 100 μm to 300 μm in a direction perpendicular to the gold foil layer.

12. The touch panel according to claim 3, wherein the touch electrode layer comprises a two-dimensional touch electrode array, the two-dimensional touch electrode array comprises a plurality of sensing electrodes, and the capacitance is formed between the plurality of sensing electrodes and the conductive layer.

13. A touch apparatus comprising the touch panel of claim 1.

14. A pressure touch detection method of the touch panel according to claim 1, comprising:
    detecting the capacitance between the touch electrode layer and the conductive layer at the touch position and in the peripheral region, wherein, upon the touch occurring, the fluid in the fluid dielectric layer flows under the touch pressure to change the capacitance between the touch electrode layer and the conductive layer at the touch position and in the peripheral region by changing the dielectric constant of the dielectric layer;
    determining the touch pressure at the touch position according to the capacitance variation between the touch electrode layer and the conductive layer at the touch position and in the peripheral region.

15. The pressure touch detection method according to claim 14, wherein detecting the capacitance between the touch electrode layer and the conductive layer at the touch position and in the peripheral region comprises:
    detecting the capacitance between the touch electrode layer and the conductive layer at the touch position as a first capacitance, the first capacitance being decreased compared with that before the touch occurs, a capacitance variation amount of the first capacitance being a first capacitance variation amount;
    detecting the capacitance between the touch electrode layer and the conductive layer in the peripheral region as a second capacitance, the second capacitance being increased compared with that before the touch occurs, and a capacitance variation amount of the second capacitance being a second capacitance variation amount.

16. The pressure touch detection method according to claim 15, wherein determining the touch pressure at the touch position according to the capacitance variation between the touch electrode layer and the conductive layer at the touch position and in the peripheral region comprises:
    calculating a ratio of the second capacitance variation amount to the first capacitance to obtain a capacitance ratio, and determining the touch pressure at the touch position according to the capacitance ratio.

17. The pressure touch detection method according to claim 16, wherein a calculation formula of the capacitance between the touch electrode layer and the conductive layer is: $C=K*\varepsilon/(d1+d2)$, where K is a constant, ε is the dielectric constant of the dielectric layer, d1 is a thickness of the solid dielectric layer, d2 is a thickness of the fluid dielectric layer, and under the touch pressure, the thickness d2 of the fluid dielectric layer at the touch position is decreased, so that both of the dielectric constant ε and the thickness (d1+d2) of the dielectric layer is decreased, and a decreasing ratio of the dielectric constant ε is larger than a decreasing ratio of the thickness (d1+d2) of the dielectric layer, causing the first capacitance to be decreased compared with that before the touch occurs.

18. The pressure touch detection method according to claim 17, wherein the touch panel is a flexible touch panel, and under the touch pressure, the thickness d2 of the fluid dielectric layer in the peripheral region is increased, so that both of the dielectric constant ε and the thickness (d1+d2) of the dielectric layer are increased, and an increasing ratio of the dielectric constant ε is larger than an increasing ratio of the thickness (d1+d2) of the dielectric layer, causing the second capacitance to be increased compared with that before the touch occurs.

19. The pressure touch detection method according to claim 17, wherein the fluid dielectric layer comprises a liquid dielectric layer and an air layer, and the air layer is located on a side of the liquid dielectric layer facing the touch electrode layer, and under the touch pressure, in the peripheral region, the thickness (d1+d2) of the dielectric layer is decreased, and the thickness of the liquid dielectric layer is increased, so that the dielectric constant ε is increased, causing the second capacitance to be increased compared with that before the touch occurs.

20. The pressure touch detection method according to claim 14, wherein the capacitance ratio is in positive proportional relationship with a value of the touch pressure, and before determining the touch pressure at the touch position, the method further comprises:
    according to the proportional relationship, dividing a plurality of capacitance ratios being detected into a plurality of capacitance ratio ranges, and dividing values of the touch pressure into a plurality of touch pressure levels, wherein the plurality of capacitance ratio ranges are in an one-to-one correspondence with the plurality of touch pressure levels,
    wherein determining the touch pressure at the touch position comprises:
    determining the touch pressure level applied to the touch apparatus according to the capacitance ratio range.

* * * * *

UNITED STATES PATENT AND TRADEMARK OFFICE
CERTIFICATE OF CORRECTION

| | | |
|---|---|---|
| PATENT NO. | : 11,231,821 B2 | Page 1 of 1 |
| APPLICATION NO. | : 16/470736 | |
| DATED | : January 25, 2022 | |
| INVENTOR(S) | : Xiangye Wei | |

It is certified that error appears in the above-identified patent and that said Letters Patent is hereby corrected as shown below:

On the Title Page

Item (73), Should read:
(73) Assignees: BOE TECHNOLOGY GROUP CO., LTD., Beijing (CN)

Signed and Sealed this
Fourth Day of June, 2024

Katherine Kelly Vidal
*Director of the United States Patent and Trademark Office*